(12) United States Patent
Wolfe et al.

(10) Patent No.: US 12,129,800 B2
(45) Date of Patent: Oct. 29, 2024

(54) FUEL NOZZLE VALVE SEALS FOR HIGH TEMPERATURE

(71) Applicant: General Electric Company, Schenectady, NY (US)

(72) Inventors: Christopher E. Wolfe, Niskayuna, NY (US); Alfred A. Mancini, Cincinnati, OH (US); Randy Joseph Tobe, Lebanon, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 119 days.

(21) Appl. No.: 17/657,182

(22) Filed: Mar. 30, 2022

(65) Prior Publication Data
US 2023/0313742 A1   Oct. 5, 2023

(51) Int. Cl.
*F16K 1/46* (2006.01)
*F02C 7/232* (2006.01)
*F16K 15/14* (2006.01)
*F23K 5/14* (2006.01)

(52) U.S. Cl.
CPC ............ *F02C 7/232* (2013.01); *F16K 1/46* (2013.01); *F16K 15/14* (2013.01); *F23K 5/147* (2013.01); *F23N 2235/24* (2020.01)

(58) Field of Classification Search
CPC ........ F23N 2235/24; F23K 5/147; F16K 1/36; F16K 1/38; F16K 1/385; F16K 25/00; F16K 25/005; F16K 1/46; F02C 7/232
See application file for complete search history.

(56) References Cited

U.S. PATENT DOCUMENTS

| 1,700,700 A | * | 1/1929 | Holzwarth | F02C 7/232 60/39.79 |
| 1,731,778 A | * | 10/1929 | Holzwarth | F02C 7/232 60/39.8 |
| 2,608,210 A | * | 8/1952 | St Clair | F16K 1/46 137/543 |
| 4,202,556 A | * | 5/1980 | Makishima | F16J 15/0887 277/644 |
| 4,282,643 A | * | 8/1981 | Yamasaki | F16L 23/20 277/614 |
| 5,014,739 A |   | 5/1991 | Csaszar |  |
| 8,393,156 B2 | * | 3/2013 | Niemeyer | F02C 7/232 137/538 |
| 8,776,831 B2 |   | 7/2014 | Otsuka et al. |  |
| 9,016,319 B2 |   | 4/2015 | Spahr |  |
| 9,194,501 B2 |   | 11/2015 | Cunningham et al. |  |
| 10,240,537 B2 |   | 3/2019 | Cadman et al. |  |
| 10,612,404 B2 |   | 4/2020 | Possert et al. |  |
| 10,995,867 B2 |   | 5/2021 | Hall-Snyder et al. |  |

(Continued)

*Primary Examiner* — Kevin F Murphy
(74) *Attorney, Agent, or Firm* — Venable LLP; Michele V. Frank

(57) ABSTRACT

A fuel nozzle valve includes a fuel nozzle valve liner having a channel with an opening for allowing fuel to flow therethrough and a seat. A plunger has a stud and a base substantially perpendicular to the stud, the plunger being configured to move relative to the fuel nozzle valve liner to seal or to open the opening of the fuel nozzle valve. The fuel nozzle valve further includes a metal resilient member configured to contact the base of the plunger and the seat of the fuel nozzle valve liner to seal the opening of the fuel nozzle valve when the plunger is moved to seal the fuel nozzle valve.

18 Claims, 3 Drawing Sheets

(56) References Cited

U.S. PATENT DOCUMENTS 11,047,249 B2  6/2021  Schwendenmann
2009/0065073 A1* 3/2009  Davis .................. F16K 31/1262
                                                    137/505.36

* cited by examiner

FUEL NOZZLE VALVE SEALS FOR HIGH TEMPERATURE

TECHNICAL FIELD

The present disclosure relates generally to seals and, in particular, to fuel nozzle valve seals for high temperature applications in gas turbine engines.

BACKGROUND

A gas turbine engine generally includes a fan and a core arranged in flow communication with one another with the core disposed downstream of the fan in the direction of flow through the gas turbine engine. The core of the gas turbine engine generally includes, in serial flow order, a compressor section, a combustion section, a turbine section, and an exhaust section. With multi-shaft gas turbine engines, the compressor section can include a high pressure compressor (HPC) disposed downstream of a low pressure compressor (LPC), and the turbine section can similarly include a low pressure turbine (LPT) disposed downstream of a high pressure turbine (HPT). With such a configuration, the HPC is coupled with the HPT via a high pressure shaft (HPS), and the LPC is coupled with the LPT via a low pressure shaft (LPS). In operation, at least a portion of air over the fan is provided to an inlet of the core. Such a portion of the air is progressively compressed by the LPC and then by the HPC until the compressed air reaches the combustion section. Fuel is mixed with the compressed air and burned within the combustion section to produce combustion gases. The combustion gases are routed from the combustion section through the HPT and then through the LPT. The flow of combustion gases through the turbine section drives the HPT and the LPT, each of which in turn drives a respective one of the HPC and the LPC via the HPS and the LPS. The combustion gases are then routed through the exhaust section, e.g., to atmosphere. The LPT drives the LPS, which drives the LPC. In addition to driving the LPC, the LPS can drive the fan through a power gearbox, which allows the fan to be rotated at fewer revolutions per unit of time than the rotational speed of the LPS for greater efficiency.

The fuel that mixed with the compressed air and burned within the combustion section is delivered through a fuel nozzle. Fuel nozzles include check valves having plungers with a relatively small diameter (for example, in the ¼ inch to ½ inch range) that are lightly loaded when closed, with loading pressures of ten psi to forty psi. Conventionally, the sealing when the valve is closed is achieved with the use of elastomers. A sealing surface of the plunger is covered with a compliant elastomer that is compressed into a mating surface, providing near-hermetic sealing. However, current fuel systems can operate at temperatures that preclude the use of elastomers for use in seals.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
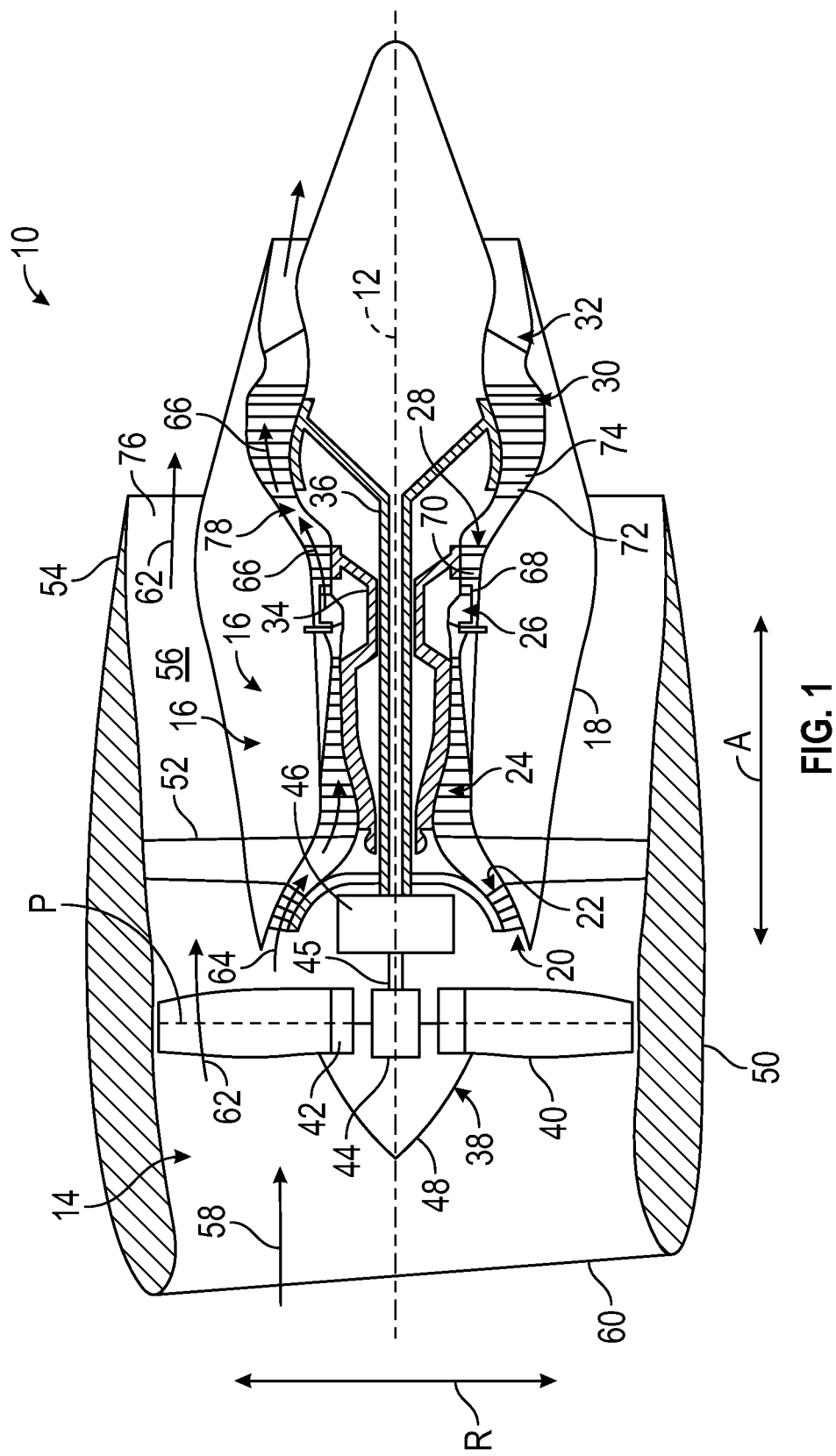
FIG. 1 is a schematic cross-sectional diagram of a turbine engine, according to an embodiment of the present disclosure.

Additional features, advantages, and embodiments of the present disclosure are set forth or apparent from a consideration of the following detailed description, drawings, and claims. Moreover, it is to be understood that the following detailed description is exemplary, and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the scope of the claims.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", is not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the term "axial" refers to directions and orientations that extend substantially parallel to a centerline of the turbine engine or the combustor. Moreover, the terms "radial" refers to directions and orientations that extend substantially orthogonal to the centerline of the turbine engine or the fuel-air mixer assembly. In addition, as used herein, the term "circumferentially" refers to directions and orientations that extend arcuately about the centerline of the turbine engine or the fuel-air mixer assembly.

As fuel systems are developed to operate with fuel temperatures exceeding the capability of elastomers, embodiments of the present disclosure seek to provide a seal for a fuel system that are all-metal, and rely on geometry to provide needed compliance to provide suitable sealing performance. For example, various configuration or seal geometries are provided herein including, (1) a thin washer clamped at the outer diameter, with the plunger pushing down near the inner diameter, (2) a cone-shaped washer that is compressed by the plunger when the valve is closed, and (3) a generally cone-shaped washer with a rounded inner edge and an outer edge angled to fit against the sealing surface. In all cases, these geometries can be configured to result in a "crisp sealing line" with an adequate contact pressure. A crisp sealing line is used herein to mean a sealing interface between the seal and the sealing surface that does not have seal to surface imperfections (leading to leaking points) and/or the contact pressure applied at the interface between the seal and the sealing surface is substantially homogenous. A further seal configuration is to provide a surface curved so as to maximize a thickness of a line of contact. This can allow reducing the contact pressure and, thus, can further reduce a vulnerability of the seal to surface imperfections. The seals can be disengaged when the valve is open, and engage the plunger when the valve is closed, preventing any fuel flow.

FIG. 1 is a schematic cross-sectional diagram of a turbine engine 10, according to an embodiment of the present disclosure. The turbine engine 10 can include, for example, a turbojet engine, a turboprop engine, a turbofan, or a turboshaft engine. As shown in FIG. 1, the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section including a booster or a low pressure (LP) compressor 22 followed downstream by a high pressure (HP) compressor 24, a combustion section 26, a turbine section including a high pressure (HP) turbine 28 followed downstream by a low pressure (LP) turbine 30, and a jet exhaust nozzle section 32. A high pressure (HP) shaft or a spool 34 drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section, the combustion section 26, the turbine section, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through inlet 60 of the nacelle 50 and/or fan section 14. As the volume of air 58 passes across the fan blades 40, a first portion of the air 58, as indicated by arrow 62, is directed or routed into the bypass airflow passage 56, and a second portion of the air 58, as indicated by arrow 64, is directed or routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or kinetic energy from the combustion gases 66 is extracted via sequential stages of HP turbine stator vanes 68 that are coupled to the outer casing 18 and the HP turbine rotor blades 70 that are coupled to the HP shaft or spool 34, thus, causing the HP shaft or spool 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This, thereby, supports operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine.

Figure 2:
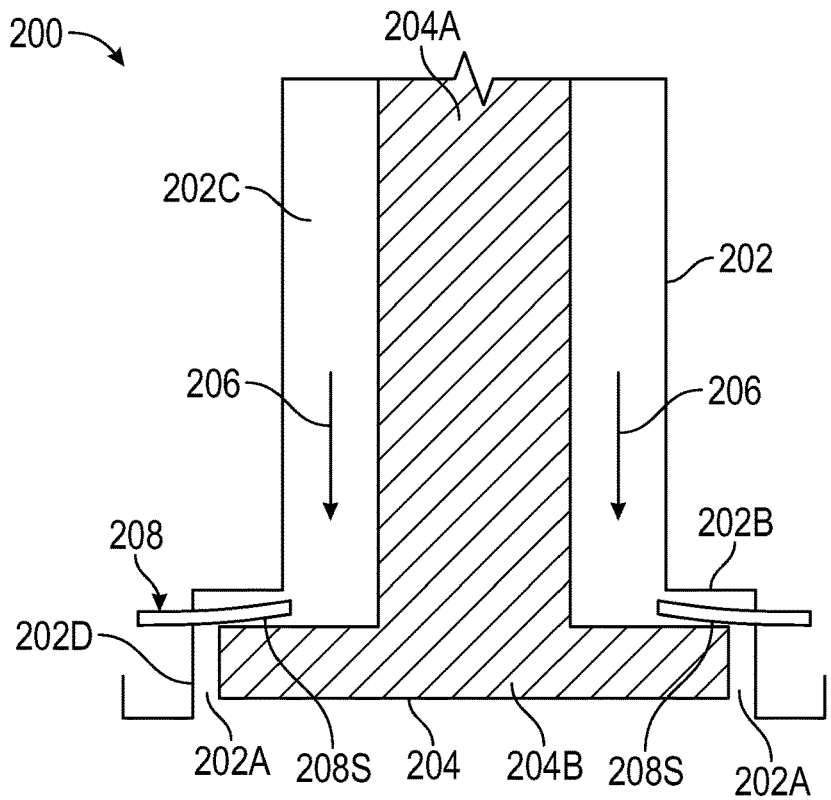
FIG. 2 is a schematic cross-sectional diagram of a fuel nozzle valve, according to an embodiment of the present disclosure.

FIG. 2 is a schematic cross-sectional diagram of a flow-metering portion of a fuel nozzle valve 200, according to an embodiment of the present disclosure. The fuel nozzle valve 200 includes a fuel nozzle valve liner 202 and a plunger 204. In an embodiment, the plunger 204 has a T-shape. The plunger 204 has a stud 204A and a base 204B connected to the stud 204A. The stud 204A and the base 204B of the plunger 204 are substantially perpendicular to each other and form the T-shape. The fuel nozzle valve liner 202 has a channel 202C to allow the stud 204A of the plunger 204 to move therethrough. The plunger 204 is configured to move relative to the fuel nozzle valve liner 202 to seal an opening 202A in the fuel nozzle valve liner 202 or open the opening 202A to enable fuel 206 to flow between the plunger 204 and the fuel nozzle valve liner 202. In the open position, the fuel 206 flows through the channel 202C of the fuel nozzle valve liner 202 and then through the opening 202A of the fuel nozzle valve liner 202. The fuel nozzle valve liner 202 also has a seat 202B. The seat 202B of the fuel nozzle valve liner 202 is configured to receive the base 204B of the plunger 204 to seal the opening 202A of the fuel nozzle valve liner 202.

The fuel nozzle valve 200 further includes a metal resilient member 208 (e.g., a curved washer or Belleville washer) configured to come in contact with both the base 204B of the plunger 204 and the seat 202B of the fuel nozzle valve liner 202. In an embodiment, the metal resilient member 208 is attached or clamped to a wall 202D of the fuel nozzle valve liner 202. The metal resilient member 208 can be made of stainless steel or other metal that can withstand relatively high temperatures without losing resilience or elasticity. The metal resilient member 208 can be slightly curved so as to provide a spring characteristic so that the resilient member 208 deforms under an applied force or pressure but can return to or towards its initial conformation when the application of pressure or force is ceased.

In operation, the fuel nozzle valve 200 can be closed by moving the plunger 204 in a closing direction until the base 204B of the plunger 204 abuts and pushes with a predetermined force against the metal resilient member 208. The metal resilient member 208 under the applied force bends slightly until the metal resilient member 208 comes in contact with and abuts against the seat 202B of the fuel nozzle valve liner 202. As the plunger 204 closes, base 204B makes contact with the metal resilient member 208, deflecting the metal resilient member 208 due to the compliant features of the metal resilient member 208. A contact surface 208S of the metal resilient member 208 with the base 204B of the plunger 204 can be designed for adequate contact pressure or a crisp contact line. The fuel nozzle valve 200 can be opened by moving the plunger 204 in an opening direction opposite to the closing direction until the base 204B of the plunger 204 releases the force or pressure applied against the metal resilient member 208. The plunger 204 continues moving to allow fuel 206 to flow through the opening 202A of the fuel nozzle valve liner 202 while the metal resilient member 208 is held in place and remains attached (for example, clamped or compressed) to the wall 202D of the fuel nozzle valve liner 202.

Figure 3:
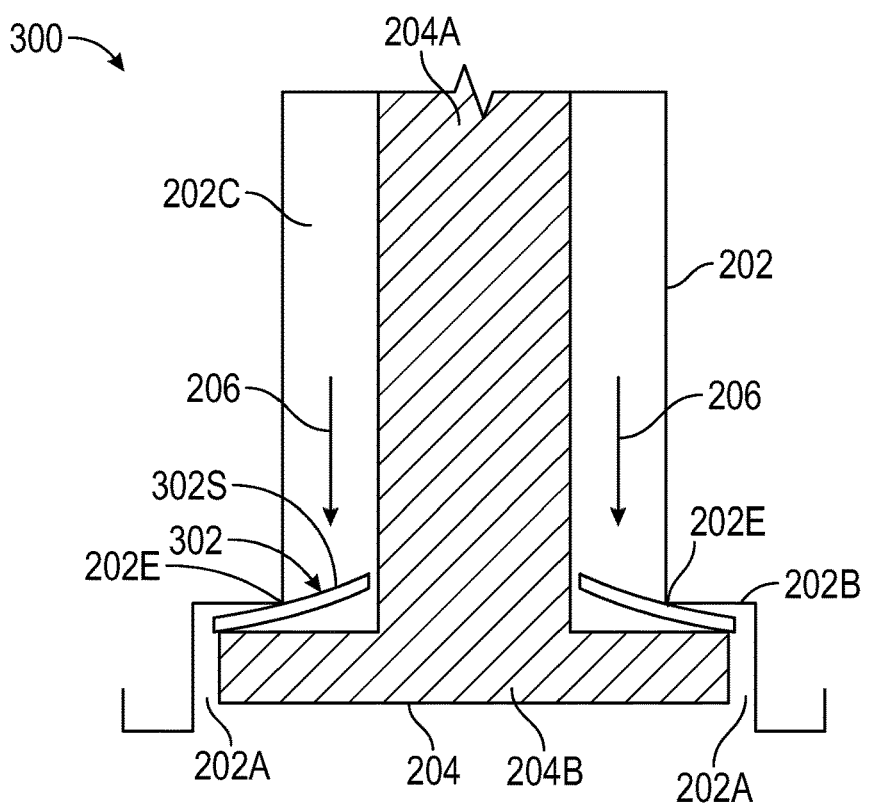
FIG. 3 is a schematic cross-sectional diagram of a fuel nozzle valve, according to another embodiment of the present disclosure.

FIG. 3 is a schematic cross-sectional diagram of the flow-metering portion of a fuel nozzle valve 300, according to another embodiment of the present disclosure. This embodiment is similar in many aspects to the embodiment shown in FIG. 2. In this embodiment, similar to the previous embodiment shown in FIG. 2, the fuel nozzle valve 300 also includes the fuel nozzle valve liner 202 and the plunger 204. Therefore, the description of common features will not be repeated in the following paragraphs. The fuel nozzle valve 300 includes a metal resilient member 302 configured to come in contact with both the base 204B of the plunger 204 and the seat 202B of the fuel nozzle valve liner 202. In this embodiment, the metal resilient member 302 is provided on or coupled with the plunger 204. For example, the metal resilient member 302 is coupled to the base 204B of the plunger 204. For example, the metal resilient member 302 is coupled to the base 204B of the plunger 204 by gluing, soldering or clamping an outer edge the metal resilient member 302 to the base 204B of the plunger 204. The metal resilient member 302 can be made of stainless steel or other metal that can withstand relatively high temperatures without losing resilience or elasticity. The metal resilient member 302 can be slightly curved so as to provide a spring characteristic. In an embodiment, the metal resilient member 302 can have a cone shape (e.g., a cone shaped washer), where the larger diameter of the cone shape can be provided in contact with the base 204B of the plunger and the smaller diameter of the cone shape can be provided abutting against the stud 204A of the plunger 204. In this way, the metal resilient member 302 having the cone shape can be fitted around the plunger 204. The metal resilient member 302 is configured to move with the plunger 204.

In operation, the fuel nozzle valve 300 can be closed by moving the plunger 204 in a closing direction until the base 204B of the plunger 204 holding the metal resilient member 302 abuts and pushes with a predetermined force against the seat 202B of the fuel nozzle valve liner 202. The metal resilient member 302 abuts against the seat 202B of the fuel nozzle valve liner 202 and under the applied force bends slightly. As the plunger 204 closes the fuel nozzle valve 300, the base 204B makes contact with the metal resilient member 302, deflecting the metal resilient member 302 due to the compliant features of the metal resilient member 302.

In the closed position, the metal resilient member 302 is compressed between the base 204B of the plunger 204 and an edge 202E of the seat 202B of the fuel nozzle valve liner 202. A contact surface 302S of the metal resilient member 302 with the edge 202E of the seat 202B can be designed for high contact pressure or a broader contact line. The fuel nozzle valve 300 can be opened by moving the plunger 204 in an opening direction opposite to the closing direction until the base 204B of the plunger 204 releases the force or pressure applied against the metal resilient member 302. The plunger 204 continues moving to allow fuel 206 to flow through the opening 202A of the fuel nozzle valve liner 202 while the metal resilient member 302 moves with the base 204B of the plunger 204. In an embodiment, a lip (not shown) can be included on the base 204B of the plunger 204, for example at an outer edge of the base 204B, to hold the metal resilient member 302 in a specific position while the plunger 204 moves to the open position. For example, the outer edge of the resilient member 302 can be inserted in the lip provided at the outer edge of the base 204 so as to couple the outer edge of the resilient member 302 to the base 204B to maintain contact between the resilient member 302 and the base 204B during movement of the plunger 204.

Figure 4:
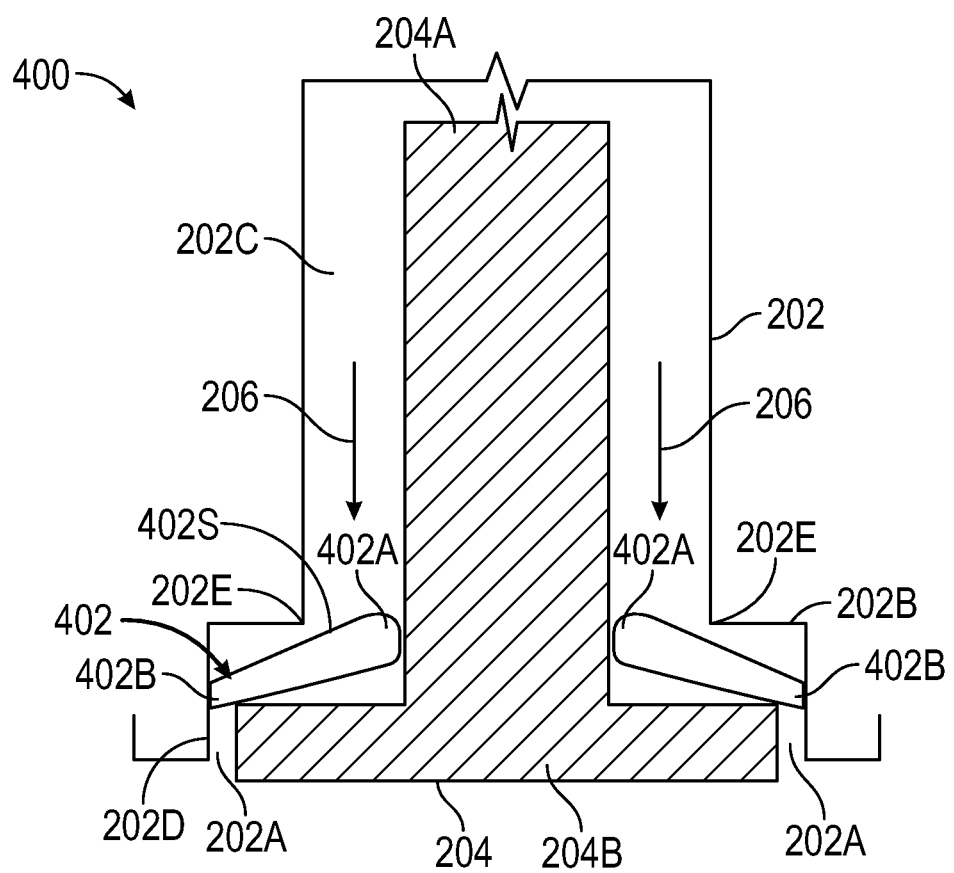
FIG. 4 is a schematic cross-sectional diagram of a fuel nozzle valve, according to yet another embodiment of the present disclosure.

FIG. 4 is a schematic cross-sectional diagram of the flow-metering portion of a fuel nozzle valve 400, according to yet another embodiment of the present disclosure. This embodiment is similar in many aspects to the embodiment shown in FIG. 3. In this embodiment, similar to the previous embodiment shown in FIG. 3, the fuel nozzle valve 400 also includes the fuel nozzle valve liner 202 and the plunger 204. Therefore, the description of common features will not be repeated in the following paragraphs. The fuel nozzle valve 400 includes a metal resilient member 402 configured to come in contact with both the base 204B of the plunger 204 and the seat 202B of the fuel nozzle valve liner 202. In this embodiment, similar to the metal resilient member 302 of the embodiment of FIG. 3, the metal resilient member 402 is provided on the base 204B. The metal resilient member 402 can be made of stainless steel or other metal that can withstand relatively high temperatures without losing resilience or elasticity. The metal resilient member 402 can be slightly curved so as to provide a spring characteristic. In an embodiment, the metal resilient member 402 can have a cone shape (e.g., a cone shaped washer), where the larger diameter of the cone shape can be provided in contact with the base 204B of the plunger and the smaller diameter of the cone shape can be provided in contact with or abutting against the stud 204A of the plunger 204. In this way, the metal resilient member 402 having the cone shape is configured to fit around the plunger 204. In an embodiment, the metal resilient member 402 is a cone-shaped washer that is sculpted with an inner edge 402A rounded to fit the shape or contour of the stud 204A of the plunger 204 and an outer edge 402B squared such that the outer edge 402B aligns with the wall 202D of the fuel nozzle valve liner 202 when the plunger 204 is moved to close the opening 202A of fuel nozzle valve 400. In an embodiment, as shown in FIG. 4, the inner edge 402A of the metal resilient member 402 is thicker than the outer edge 402B of the metal resilient member 402. To reduce or substantially to prevent the possibility of seal fluttering in the flow of the fuel 206 when the fuel nozzle valve 400 is open, the metal resilient member 402 can be oriented with the thinner outer edge 402B oriented into the direction of fuel flow.

In operation, the fuel nozzle valve 400 can be closed by moving the plunger 204 in a closing direction until the base 204B of the plunger 204 holding the metal resilient member 402 abuts and pushes with a predetermined force against the seat 202B of the fuel nozzle valve liner 202. The metal resilient member 402 abuts against the seat 202B of the fuel nozzle valve liner 202 and under the applied force bends slightly. As the plunger 204 closes the fuel nozzle valve liner 202, the base 204B makes contact with the metal resilient member 402, deflecting the metal resilient member 402 due to the compliant features of the metal resilient member 402.

In the closed position, the metal resilient member 402 is compressed between the base 204B of the plunger 204 and an edge 202E of the seat 202B of the fuel nozzle valve liner 202. A contact surface 402S of the metal resilient member 402 with the edge 202E of the seat 202B can be designed for high contact pressure or a broader contact line. The fuel nozzle valve 400 can be opened by moving the plunger 204 in an opening direction opposite to the closing direction until the base 204B of the plunger 204 releases the force or pressure applied against the metal resilient member 402. The plunger 204 continues moving to allow fuel 206 to flow through the opening 202A of the fuel nozzle valve 400 while the metal resilient member 402 moves with the base 204B of the plunger 204.

High temperature fuel has a number of engine system-level advantages both for combustion efficiency and thermal management capabilities. Seals in the fuel nozzles that can perform at elevated temperatures beyond the capability of elastomers are an enabling technology.

The metal resilient member 208, 302, 402 can be configured to operate in relatively high temperature environment (between 800° F. and 1500° F.). The metal resilient member 208, 302, 402 can provide sealing with relatively low contact pressure with relatively even contact pressure. In some embodiments, the metal resilient member 208, 302, 402 can be coated with a material to provide additional hardness and/or resistance to particles in flow. The coating material can be applied to the overall surface of the metal resilient member 208, 302, 402. For example, compliant coatings can be used for improved evenness in contact pressure with a greater contact area.

As can be appreciated from the discussion above, a fuel nozzle valve includes a fuel nozzle valve liner having a channel with an opening for allowing fuel to flow therethrough and a seat, and a plunger having a stud and a base substantially perpendicular to the stud, the plunger being configured to move relative to the fuel nozzle valve liner to seal or to open the opening of the fuel nozzle valve. The fuel system further includes a metal resilient member configured to contact the base of the plunger and the seat of the fuel nozzle valve to seal the opening of the fuel nozzle valve when the plunger is moved to seal the fuel nozzle valve.

The fuel nozzle valve according to the above clause, the metal resilient member being attached to a wall of the fuel nozzle valve and the metal resilient member remaining attached to the wall of the fuel nozzle valve when the plunger is moved to open the fuel nozzle valve.

The fuel nozzle valve according to any of the above clauses, when the plunger is moved to close and seal the fuel nozzle valve, the base of the plunger abuts and pushes the metal resilient member until the metal resilient member abuts against the seat of the fuel nozzle valve.

The fuel nozzle valve according to any of the above clauses, the metal resilient member being coupled with the plunger.

The fuel nozzle valve according to any of the above clauses, the metal resilient member being configured to move with the plunger.

The fuel nozzle valve according to any of the above clauses, the metal resilient member being configured to be compressed between the base of the plunger and an edge of the seat of the fuel nozzle valve liner.

The fuel nozzle valve according to any of the above clauses, the metal resilient member being coated with a coating material to provide additional hardness and/or resistance to particles in fuel flow.

The fuel nozzle valve according to any of the above clauses, the metal resilient member having a cone shape, a larger diameter of the cone shape being in contact with the base of the plunger and a narrower diameter of the cone shape being in contact with the stud of the plunger.

The fuel nozzle valve according to any of the above clauses, the metal resilient member having the cone shape being configured to fit around the plunger.

The fuel nozzle valve according to any of the above clauses, the metal resilient member having the cone shape being configured to have a round inner edge to provide a contact surface with the stud of the plunger and an outer edge squared so that the outer edge aligns with a wall of the fuel nozzle valve liner when the plunger is moved to close the opening of the fuel nozzle valve.

The fuel nozzle valve according to any of the above clauses, an inner edge of the metal resilient member having the cone shape being thicker than an outer edge of the metal resilient member having the cone shape, the outer edge being oriented in a direction of flow of the fuel to reduce or substantially to prevent seal fluttering when the fuel nozzle valve is open. Seal fluttering may occur when the seal moves in an irregular or trembling motion (such as flapping).

Another aspect of the present disclosure is to provide a turbine engine having a fuel system. The fuel system includes a fuel nozzle valve having a channel with an opening for allowing fuel to flow therethrough and a seat, and a plunger having a stud and a base substantially perpendicular to the stud, the plunger being configured to move relative to the fuel nozzle valve liner to seal or open the opening of the fuel nozzle valve. The fuel system further includes a metal resilient member configured to contact the base of the plunger and the seat of the fuel nozzle valve to seal the opening of the fuel nozzle valve when the plunger is moved to seal the fuel nozzle valve.

The turbine engine according to the above clause, the metal resilient member being attached to a wall of the fuel nozzle valve liner and the metal resilient member remaining attached to the wall of the fuel nozzle valve liner when the plunger is moved to open the fuel nozzle valve.

The turbine engine according to any of the above clauses, when the plunger is moved to close and to seal the fuel nozzle valve, the base of the plunger abuts and pushes the metal resilient member until the metal resilient member abuts against the seat of the fuel nozzle valve liner.

The turbine engine according to any of the above clauses, the metal resilient member being coupled with the plunger.

The turbine engine according to any of the above clauses, the metal resilient member being configured to move with the plunger.

The turbine engine according to any of the above clauses, the metal resilient member being configured to be compressed between the base of the plunger and an edge of the seat of the fuel nozzle valve liner.

The turbine engine according to any of the above clauses, the metal resilient member being coated with a coating material to provide additional hardness and/or resistance to particles in the fuel flow.

The turbine engine according to any of the above clauses, the metal resilient member having a cone shape, a larger diameter of the cone shape being in contact with the base of the plunger and a narrower diameter of the cone shape being in contact with the stud of the plunger.

The turbine engine according to any of the above clauses, the metal resilient member having the cone shape being configured to fit around the plunger.

The turbine engine according to any of the above clauses, the metal resilient member having the cone shape being configured to have a round inner edge to provide a contact surface with the stud of the plunger and an outer edge squared so that the outer edge aligns with a wall of the fuel nozzle valve liner when the plunger is moved to close the opening of the fuel nozzle valve.

The turbine engine according to any of the above clauses, an inner edge of the metal resilient member having the cone shape being thicker than an outer edge of the metal resilient member having the cone shape, the outer edge being oriented into a direction of flow of the fuel to reduce or substantially prevent seal fluttering when the fuel nozzle valve is open.

Although the foregoing description is directed to the preferred embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A fuel nozzle valve comprising:
   a fuel nozzle valve liner having a channel with an opening for allowing fuel to flow therethrough, and a seat;
   a plunger having a stud and a base substantially perpendicular to the stud, the plunger being configured to move relative to the fuel nozzle valve liner to seal or to open the opening of the fuel nozzle valve; and
   a metal resilient member configured to contact the base of the plunger and the seat of the fuel nozzle valve liner to seal the opening of the fuel nozzle valve when the plunger is moved to seal the fuel nozzle valve,
   wherein the metal resilient member has a cone shape and is configured to be compressed between the base of the plunger and an edge of the seat of the fuel nozzle valve liner, and a contact surface of the metal resilient member with the edge of the seat is located between an inner edge of the metal resilient member and an outer edge of the metal resilient member.

2. The fuel nozzle valve according to claim 1, wherein, when the plunger is moved to close and to seal the fuel nozzle valve, the base of the plunger abuts and pushes the metal resilient member until the metal resilient member abuts against the seat of the fuel nozzle valve liner.

3. The fuel nozzle valve according to claim 1, wherein the metal resilient member is coupled with the plunger.

4. The fuel nozzle valve according to claim 1, wherein the metal resilient member is configured to move with the plunger.

5. The fuel nozzle valve according to claim 1, wherein the metal resilient member is configured to be compressed between the base of the plunger and the edge of the seat of the fuel nozzle valve liner.

6. The fuel nozzle valve according to claim 1, wherein the metal resilient member is coated with a coating material to provide additional hardness and/or resistance to particles in the fuel.

7. The fuel nozzle valve according to claim 1, wherein a larger diameter of the cone shape is in contact with the base of the plunger and a narrower diameter of the cone shape is in contact with the stud of the plunger.

8. The fuel nozzle valve according to claim 7, wherein the metal resilient member having the cone shape is configured to fit around the plunger.

9. The fuel nozzle valve according to claim 7, wherein the metal resilient member having the cone shape is configured to have a round inner edge to provide a contact surface with the stud of the plunger and an outer edge squared so that the outer edge aligns with a wall of the fuel nozzle valve liner when the plunger is moved to close the opening of the fuel nozzle valve.

10. The fuel nozzle valve according to claim 7, wherein an inner edge of the metal resilient member having the cone shape is thicker than an outer edge of the metal resilient member having the cone shape, wherein the outer edge is oriented into a direction of flow of the fuel to reduce or substantially to prevent seal fluttering when the fuel nozzle valve is open.

11. A turbine engine comprising:
    a fuel nozzle valve comprising:
    (a) a fuel nozzle valve liner having a channel with an opening for allowing fuel to flow therethrough, and a seat;
    (b) a plunger having a stud and a base substantially perpendicular to the stud, the plunger being configured to move relative to the fuel nozzle valve liner to seal or to open the opening of the fuel nozzle valve; and
    (c) a metal resilient member configured to contact the base of the plunger and the seat of the fuel nozzle valve to seal the opening of the fuel nozzle valve when the plunger is moved to seal the fuel nozzle valve,
    wherein the metal resilient member has a cone shape and is configured to be compressed between the base of the plunger and an edge of the seat of the fuel nozzle valve liner, and a contact surface of the metal resilient member with the edge of the seat is located between an inner edge of the metal resilient member and an outer edge of the metal resilient member.

12. The turbine engine according to claim 11, wherein, when the plunger is moved to close and to seal the fuel nozzle valve, the base of the plunger abuts and pushes the metal resilient member until the metal resilient member abuts against the seat of the fuel nozzle valve liner.

13. The turbine engine according to claim 11, wherein the metal resilient member is coupled with the plunger.

14. The turbine engine according to claim 11, wherein the metal resilient member is configured to move with the plunger.

15. The turbine engine according to claim 11, wherein a larger diameter of the cone shape is in contact with the base of the plunger and a narrower diameter of the cone shape is in contact with the stud of the plunger.

16. The turbine engine according to claim 15, wherein the metal resilient member having the cone shape is configured to fit around the plunger.

17. The turbine engine according to claim 15, wherein the metal resilient member having the cone shape is configured to have a round inner edge to provide a contact surface with the stud of the plunger and an outer edge squared so that the outer edge aligns with a wall of the fuel nozzle valve liner when the plunger is moved to close the opening of fuel nozzle valve.

18. The turbine engine according to claim 15, wherein an inner edge of the metal resilient member having the cone shape is thicker than an outer edge of the metal resilient member having the cone shape, wherein the outer edge is oriented into a direction of the flow of the fuel to reduce or substantially to prevent seal fluttering when the fuel nozzle valve is open.

* * * * *